United States Patent
Imanari et al.

(10) Patent No.: US 7,169,338 B2
(45) Date of Patent: Jan. 30, 2007

(54) FOAM-MOLDED ARTICLE AND MANUFACTURING METHOD THEREOF

(75) Inventors: Daisuke Imanari, Tochigi (JP);
 Masayasu Okuda, Tochigi (JP);
 Naochika Kogure, Tochigi-ken (JP);
 Masato Naito, Tochigi-ken (JP)

(73) Assignee: JSP Corporation, Tokyo (JP)

( * ) Notice: Subject to any disclaimer, the term of this patent is extended or adjusted under 35 U.S.C. 154(b) by 233 days.

(21) Appl. No.: 10/782,941

(22) Filed: Feb. 23, 2004

(65) Prior Publication Data

US 2004/0166269 A1    Aug. 26, 2004

(30) Foreign Application Priority Data

Feb. 21, 2003    (JP)    ............... 2003/044944

(51) Int. Cl.
 B29C 44/02    (2006.01)
 B29C 44/06    (2006.01)
 B29C 49/04    (2006.01)

(52) U.S. Cl. .................. 264/45.9; 264/50; 264/53; 264/514; 264/515

(58) Field of Classification Search ............... 264/45.9, 264/50, 514, 515, 53
See application file for complete search history.

(56) References Cited

U.S. PATENT DOCUMENTS 4,438,238 A * 3/1984 Fukushima et al. ......... 525/240
5,714,227 A 2/1998 Sugawara et al.
6,376,059 B1 * 4/2002 Anderson et al. ......... 428/314.8

FOREIGN PATENT DOCUMENTS

| EP | 1057608 | 12/2000 |
|---|---|---|
| JP | 6 312449 | 11/1994 |
| JP | 2001 018283 | 1/2001 |
| JP | 2001 179805 | 7/2001 |
| WO | WO 98/53986 | 12/1998 |
| WO | WO 99/32544 | 7/1999 |

* cited by examiner

*Primary Examiner*—Allan R. Kuhns
(74) *Attorney, Agent, or Firm*—Sherman & Associates

(57) ABSTRACT

Provided is a method for manufacturing a foam-molded article by molding between molds a parison with a foam layer formed by extruding an expandable molten resin composition, obtained by melt-kneading a polyethylene resin and a physical foaming agent, to an area of low pressure from a die, wherein the polyethylene resin is selected from those having a melt flow rate of 0.1 to 25 g/10 minutes and a melt tension of not less than 1.5 cN, and wherein the apparent density of the foam layer in the foam-molded article is about 0.04 to 0.3 g/cm$^3$.

6 Claims, 4 Drawing Sheets

FOAM-MOLDED ARTICLE AND MANUFACTURING METHOD THEREOF

BACKGROUND OF THE INVENTION

1. Field of the Invention

The present invention relates to a foam-molded article obtained by sandwiching between molds a parison with a foam layer formed by a process in which an expandable molten resin composition produced by kneading a polyethylene resin melt and a physical foaming agent inside an extruder is extruded and foamed from a die in an area of low pressure, and to a manufacturing method thereof.

2. Description of the Related Art

An expandable molten resin composition is obtained by means of a process in which a thermoplastic resin is heated in an extruder and kneaded to obtain a melt, the melt and a foaming agent are kneaded, and the kneaded material is then cooled to a temperature suitable for foaming. Foam-molded articles produced by processes in which a parison obtained by extruding the resulting composition from a die to an area of low pressure and allowing the composition to foam is sandwiched and molded between molds can be used in ducts, automobile components, containers, electrical appliance enclosure materials, and other products that require thermal-insulating characteristics, soundproofing characteristics, and other characteristics. Methods for manufacturing this type of foam-molded article are cited in Japanese Patent Application Laid-open Nos. H6-312449, 2001-179805, 2001-18283, and other publications.

Conventionally, many polypropylenes and polystyrenes have been studied as raw material resins for foam-molded articles, but the foam-molded articles in which these materials constitute the base resin have insufficient low-temperature impact resistance. In view of the above, polyethylene that is suitable for use at low temperature has come to be studied, as cited in the above-mentioned prior art literature. It is cited in an example given in Japanese Patent Application Laid-open No. H6-312449 that a multilayer parison having a skin layer of high-density polyethylene and a foam layer obtained by foaming a high-density polyethylene with the aid of a chemical foaming agent is molded between molds. In Japanese Patent Application Laid-open No. 2001-179805, a method is cited whereby a multilayer parison provided with a foam layer in which a low-density polyethylene is foamed with the aid of a physical foaming agent, and a polyethylene resin layer on at least the external surface of the foam layer, is molded in a mold so that at least some portions of the innermost pairs of surfaces of the parison fuse with each other to form a foam-molded article having a polyethylene resin layer on the surface of the low-density polyethylene foam layer; and it is also cited that a physical foaming agent is preferably used to obtain a foam layer with a low apparent density. Japanese Patent Application Laid-open No. 2001-18283 cites a method whereby in order to form a foam layer of low apparent density with the aid of a physical foaming agent when sandwiching and molding a parison with a polyethylene foam layer in a mold to obtain a foam-molded article, air is blown into the parison in a state in which the pressure between the internal surface of the mold and the external surface of the parison is kept at a specific level, the interior of the parison is kept at a pressure that is higher than the pressure between the internal surface of the mold and the external surface of the parison, the pressure within the parison is subsequently increased to a specific pressure range to mold the parison, the parison is then cooled while the pressure inside the parison and outside the parison is kept within a specific range, and a foam-molded article is obtained. In Japanese Patent Application Laid-open No. 2001-18283, a specific example is cited whereby a foam-molded article is obtained by molding a parison produced by causing low-density polyethylene to foam with butane, which serves as the foaming agent.

As cited in the prior art literature above, it is known that a foam-molded article may be obtained by molding between molds a parison having a polyethylene foam layer, and it is also known, as cited in Japanese Patent Application Laid-open Nos. 2001-179805 and 2001-18283, that a molded article having a foam layer with a low apparent density may be obtained by using a physical foaming agent.

In view of the above, the present inventors discovered that among polyethylenes, high-density polyethylene is preferably used as the resin that comprises the foam layer in order to impart greater mechanical strength and heat resistance to a foam-molded article. When a chemical foaming agent such as that cited in Japanese Patent Application Laid-open No. H6-312449 is used, a parison having a high-density polyethylene foam layer can easily be obtained, but the apparent density of the foam layer cannot be brought not more than 0.4 g/cm$^3$. Also, in a parison obtained by causing high-density polyethylene to foam with a physical foaming agent as cited in Japanese Patent Application Laid-open Nos. 2001-179805 and 2001-18283, the foam layer has an apparent density of not more than 0.3 g/cm$^3$, and an adequate parison cannot be obtained.

SUMMARY OF THE INVENTION

The present invention was contrived to resolve the above-stated problems, and the inventors perfected the present invention having discovered that a parison with a polyethylene resin foam layer of low apparent density that has excellent mechanical strength and heat resistance can be obtained by causing a polyethylene resin selected from among polyethylene resins that satisfy specific melt characteristics and thermal characteristics, and resins obtained by mixing high-density polyethylene that satisfies specific melt characteristics and low-density polyethylene that satisfies specific melt characteristics in a specific ratio to foam with the aid of a physical foaming agent to form a foam layer, and that a foam-molded article with excellent physical properties such as lightweight, mechanical strength, heat resistance, and impact resistance in low temperature conditions can be obtained by molding this parison between molds.

In the method for manufacturing a foam-molded article in accordance with the present invention, a foamed article is obtained by molding between molds a parison with a foam layer formed by extruding an expandable molten resin composition, obtained by melt-kneading a polyethylene resin and a physical foaming agent, to an area of low pressure from a die, wherein the polyethylene resin is selected from at least any of the following I), II), and III), and wherein the apparent density of the foam layer in the foam-molded article is about 0.04 to 0.3 g/cm$^3$.

I) A resin comprising 40 to 85 wt % polyethylene (A) with a density that is more than 0.94 g/cm$^3$ and not more than 0.97 g/cm$^3$, and a melt flow rate of 0.1 to 20 g/10 minutes; and 15 to 60 wt % polyethylene (B) with a density of 0.89 to 0.94 g/cm$^3$, a melt flow rate of 0.2 to 20 g/10 minutes, and a melt tension of not less than 2 cN (provided that the total of polyethylene (A) and (B) is 100 wt %).

II) A resin which has at least one endothermic peak having a top temperature of not less than 125° C. on a DSC curve obtained by differential scanning calorimetry, and in which the ratio of the heat quantity of the endothermic peak(s) at not less than 125° C. with respect to the total heat quantity of the endothermic peak(s) is 50 to 95%, melt flow rate is 0.2 to 25 g/10 minutes, and melt tension is not less than 1.5 cN.

III) A resin which comprises 40 to 85 wt % polyethylene (A) having a density more than 0.94 g/cm$^3$ and not more than 0.97 g/cm$^3$, and a melt flow rate of 0.1 to 20 g/10 minutes; and 15 to 60 wt % polyethylene (B) having a density of 0.89 to 0.94 g/cm$^3$, a melt flow rate of 0.2 to 20 g/10 minutes, and a melt tension of not less than 2 cN (provided that the total of polyethylene (A) and (B) is 100 wt %); which has at least one endothermic peak having a top temperature of not less than 125° C. on a DSC curve obtained by differential scanning calorimetry; and in which the ratio of the heat quantity of the endothermic peak(s) at not less than 125° C. with respect to the total heat quantity of the endothermic peak(s) is 50 to 95%, melt flow rate 0.2 to 25 g/10 minutes, and melt tension is not less than 1.5 cN.

According to the present invention, a polyethylene resin foam-molded article having an apparent density of the foam layer of not more than 0.3 g/cm$^3$, excellent heat resistance and mechanical strength can easily be obtained by using a resin that satisfies any of the above-stated conditions I), II), and III), even when using a resin comprising a high-density polyethylene whose foaming characteristics are poor in comparison with a low-density polyethylene.

The foam-molded article of the present invention may or may not have a hollow portion in the interior and can be obtained by the above-described method, with the apparent density of the foam layer being about 0.04 to 0.3 g/cm$^3$, and the thickness of the foam layer 2 to 25 mm. The foam-molded article of the present invention has excellent heat resistance, mechanical strength, and low-temperature impact resistance, and possesses excellent lightweight, thermal-insulating characteristics, soundproofing characteristics, vibration-proofing characteristics, chemical resistance, and recycling properties.

DESCRIPTION OF THE PREFERRED EMBODIMENTS

Figure 1:
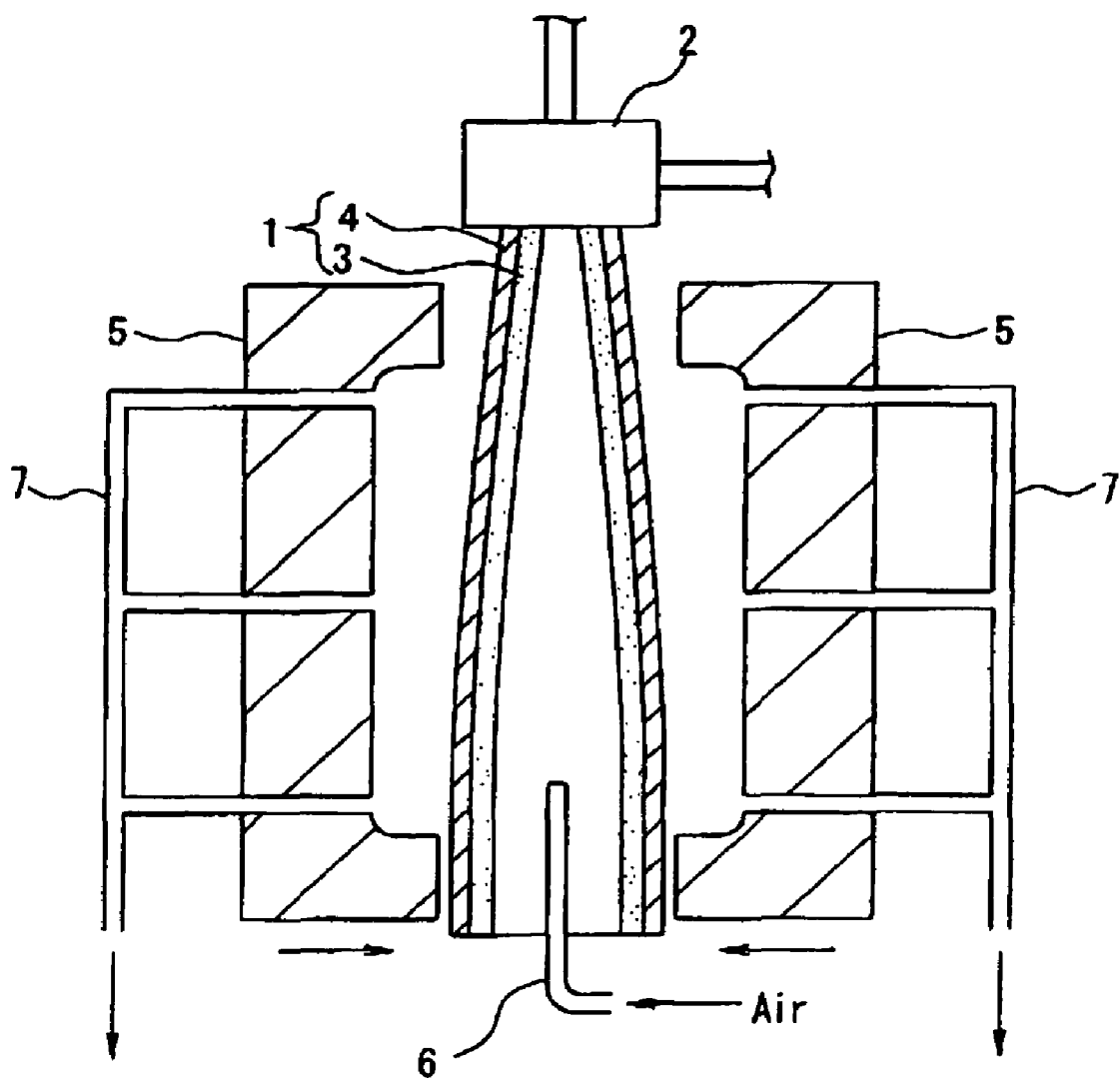
FIG. 1 is a diagram depicting a manufacturing step of the foam-molded article of the present invention.

FIG. 1 depicts an example of the manufacturing method for a foam-molded article of the present invention. In FIG. 1, 1 is a parison, and 2 an annular die. The parison 1 may be one that comprises solely a foam layer, and may be one that has a thermoplastic resin layer on the outside and/or on the inside of the foam layer. The example shown in FIG. 1 is a multilayer parison 1 provided with a thermoplastic resin layer 4 on the outside of the foam layer 3. Such as multilayer parison 1 can be obtained as described below. Although not specifically depicted, an expandable molten resin composition for forming a foam layer 3 is obtained by heating polyethylene resin and a nucleating agent inside of an extruder, kneading the components to form a melt, injecting a physical foaming agent into the melt, kneading further, and thereafter cooling the resulting molten resin composition at a temperature suitable for foaming. A molten resin for forming the resin layer 4 is obtained by Heating and kneading a thermoplastic resin inside of another extruder. Next, the multilayer parison may be formed by separately accumulating the expandable molten resin composition and the molten resin in individual accumulators connected to the downstream side of individual extruders, then discharging the expandable molten resin composition and the molten resin from the individual accumulators, and merging and co-extruding these in an annular die 2 such as that shown in FIG. 1. The foam-molded article 8 of the present invention may be formed by molding the parison 1 between molds 5. To mold the parison 1 between the molds 5, a method may be adopted whereby the external surface of the parison 1 is caused to adhere to the internal surfaces of the molds 5, and the parison is caused to assume the shape of the inner surfaces of the molds 5 while air is blown from an air blow pipe 6 into the parison 1, or air is drawn between the internal surfaces of the molds 5 and the external surface of the parison 1 by means of a reduced-pressure pipe 7, or air is blown into the parison 1 by means of the air blow pipe 6 and simultaneously drawn through a reduced-pressure pipe 7. This method is preferable as a method for obtaining a foam-molded article having a hollow portion 9 such as that shown in FIG. 2. Although not specifically depicted, the foam-molded article 8 of the present invention may be one that takes a form in which a portion of the internal surface of the parison 1 is fused, or one that takes a form that is completely fused and that does not have a hollow portion 9. The foam-molded article having a form in which a portion of the internal surface of the parison 1 is fused is preferably molded so that 40% or more, or 60% or more of the area of the internal surface of the parison is fused, because the mechanical strength is thereby improved. To obtain an foam-molded article 8 having a form in which the internal surface of the parison 1 is completely fused, the parison 1 is preferably enclosed and molded while air is drawn from within the parison 1 as required, instead of the air being blown through the air blow pipe 6 into the parison 1.

Figure 2:
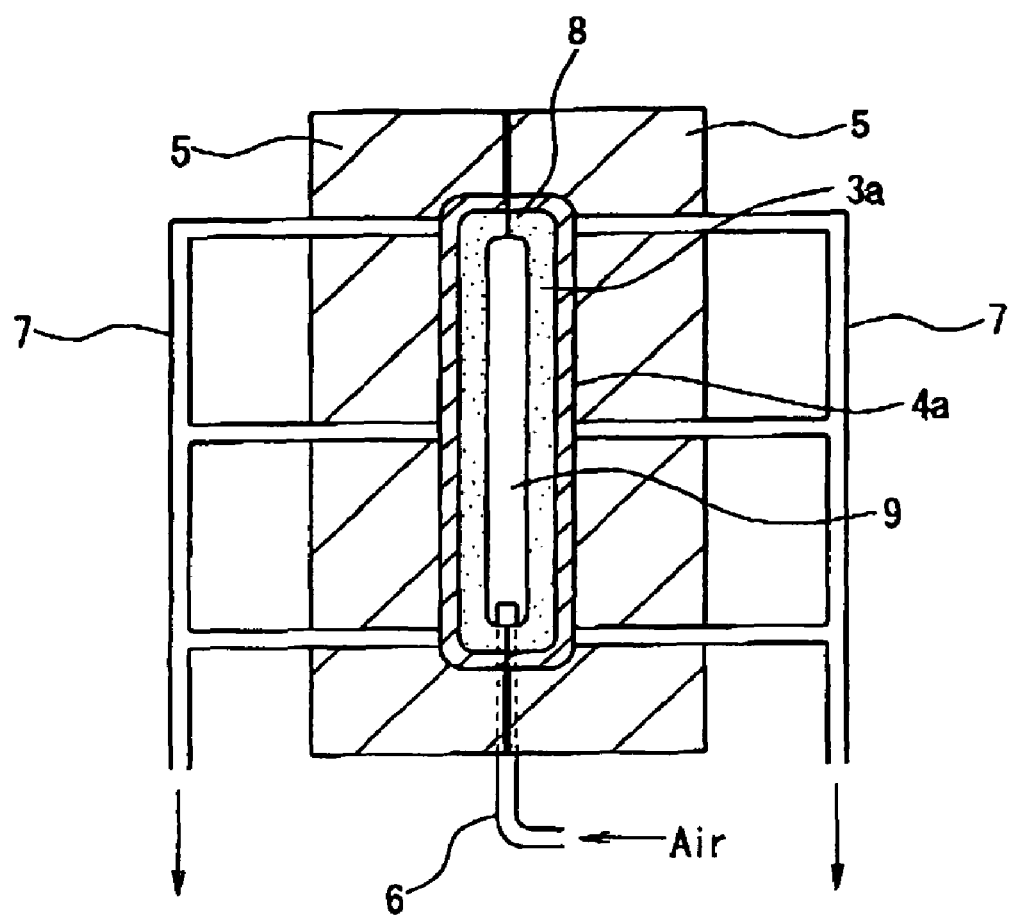
FIG. 2 is a diagram depicting another manufacturing step of the foam-molded article of the present invention.

The foam-molded article 8 shown in FIG. 2 as an example of the present invention in which a hollow portion 9 is formed in the interior, and examples of foam-molded articles (may also be referred to hereinafter as a hollow foam-molded article) with a such a hollow portion 9 include ducts and other tube-like shapes, hollow container-shaped objects that are used as tanks and bottles with screw caps or the like, objects with hollow barrel-like shapes that are used as floats or the like, and objects with hollow plate shapes that are used as trunk lids, bath covers, and the like. The hollow portion 9 may be one that is formed by leaving the internal peripheral side of the parison 1 in a completely unfused state as shown in FIG. 2, but the hollow portion may also be one in which the internal surface of the parison 1 is formed by partial fusion. The foam-molded article 8 of the present invention may be a foam-molded article (may also be referred to hereinafter as a solid foam-molded article) in which the internal surface of the parison 1 (not specifically depicted) is completely fused and does not have a hollow portion. Examples of a solid foam-molded article include flat shapes used as trunk lids, bath covers, and the like, and box-shaped objects having an opening mouth in the upper surface that are used for transporting and storing fish, fruit, and other food items. The hollow foam-molded article or the solid foam-molded article of the present invention may be one in which ribs are formed as required. The known molding methods cited in WO99/28111 and Japanese Patent Application Laid-open Nos. 2001-18283 and 2000-334759, for example, may be used for molding the hollow foam-molded article or the solid foam-molded article of the present invention.

The foam-molded article 8 of the present invention may be one that has a monolayer structure composed solely of a foam layer 3a, but providing a thermoplastic resin layer 4a on the outside of the foam layer 3a in the manner shown in FIG. 2 is preferred because of the improved surface smoothness and other factors related to external appearance, and because of the excellent compressive strength, flexural strength, tensile strength, and other factors related to mechanical strength. The foam-molded article 8 can be endowed with gas barrier characteristics and other functions when the thermoplastic resin layer 4a is structured with a functional thermoplastic resin. The foam-molded article 8 having the thermoplastic resin layer 4a on the outside of the foam layer 3a can be obtained by molding a multilayer parison 1 having a thermoplastic resin layer 4 on the outside of the foam layer 3, as shown in FIG. 1.

The foam-molded article 8 of the present invention is obtained by molding a parison 1 between molds. This means that the foam layer 3a of the foam-molded article 8 is constituted by the foam layer 3 of the parison 1. Since the foam layer 3 of the parison 1 is assumed to undergo deformation such as stretching during the molding process, the foam layer 3a of the foam-molded article 8 and the foam layer 3 of the parison 1 are not always similar in characteristics such as cell shape and apparent density.

Although not specifically depicted, the foam-molded article 8 of the present invention may be one having a thermoplastic resin layer on the inside as well as on the outside of the foam layer 3a, or may be one having a thermoplastic resin layer solely on the inside of the foam layer 3a. The foam-molded article with a thermoplastic resin layer on the inside of the foam layer 3a may be produced by molding a parison with a thermoplastic resin layer on the inside of the foam layer 3. Such a foam-molded article has excellent mechanical strength, and when the foam-molded article takes a cylindrical form, a hollow container form, or a hollow barrel form, the surface smoothness of the internal surfaces of the foam-molded article possess improved smoothness, and water resistance, barrier characteristics, and other functions of the foam-molded article can be further improved by selecting the desired resin for forming the thermoplastic resin layer.

The foam-molded article 8 of the present invention is not limited to one produced by molding a parison 1 produced by extruding an expandable molten resin composition from an annular die 2 as described above, but may also be one produced by forming two foam articles in the form of sheets by separately extruding expandable molten resin compositions from two T-dies, fusing both end areas while sandwiching these two foam articles in sheet form between molds, and molding a cylindrically-shaped parison by sandwiching the sheets between the molds, for example.

The polyethylene resin used to form the foam layer 3 of the parison 1 with the method for manufacturing a foam-molded article of the present invention is a resin selected from among the following I), II), and III), and is an ethylene homopolymer or an ethylene copolymer whose ethylene component units are not less than 50 mol %. Furthermore, a resin obtained by mixing another polymer in a ratio of 40 parts by weight or less, and preferably 20 parts by weight or less per 100 parts by-weight of any of the following I), II), and III) may be used as the polyethylene resin used for forming the foam layer 3, assuming that the objects and effects of the present invention are achieved.

I) A resin comprising 40 to 85 wt % polyethylene (A) with a density that is more than 0.94 g/cm$^3$ and not more than 0.97 g/cm$^3$, and a melt flow rate of 0.1 to 20 g/10 minutes; and 15 to 60 wt % polyethylene (B) with a density of 0.89 to 0.94 g/cm$^3$, a melt flow rate of 0.2 to 20 g/10 minutes, and a melt tension of not less than 2 cN (The upper limit of the MT is about 40 cN) (provided that the total of polyethylene (A) and (B) is 100 wt %).

II) A resin which has at least one endothermic peak having a top temperature of not less than 125° C. (The upper limit of the temperature is about 180° C.) on a DSC curve obtained by differential scanning calorimetry, and in which the ratio of the heat quantity of the endothermic peak(s) at not less than 125° C. (The upper limit of the temperature is about 180° C.) with respect to the total heat quantity of the endothermic peak(s) is 50 to 95%, melt flow rate is 0.2 to 25 g/10 minutes, and melt tension is not less than 1.5 cN (The upper limit of MT is about 40 cN.).

III) A resin which comprises 40 to 85 wt % polyethylene (A) having a density more than 0.94 g/cm$^3$ and not more than 0.97 g/cm$^3$, and a melt flow rate of 0.1 to 20 g/10 minutes; and 15 to 60 wt % polyethylene (B) having a density of 0.89 to 0.94 g/cm$^3$, a melt flow rate of 0.2 to 20 g/10 minutes, and a melt tension of not less than 2 cN (The upper limit of the MT is about 40 cN) (provided that the total of polyethylene (A) and (B) is 100 wt %); which has at least one endothermic peak having a top temperature of not less than 125° C. (The upper limit of the temperature is about 180° C.) on a DSC curve obtained by differential scanning calorimetry; and in which the ratio of the heat quantity of the endothermic peak(s) at not less than 125° C. (The upper limit of the temperature is about 180° C.) with respect to the total heat quantity of the endothermic peak(s) is 50 to 95%, melt flow rate is 0.2 to 25 g/10 minutes, and melt tension is not less than 1.5 cN (The upper limit of the MT is about 40 cN).

Examples of suitable ethylene homopolymers or copolymers described above include low-density polyethylene, linear low-density polyethylene, high-density polyethylene, ethylene/acrylic acid copolymers, ethylene/acrylic acid ester copolymers, ethylene/methacrylic acid copolymers, ethylene/methacrylic acid ester copolymers, ethylene/vinyl acetate copolymers, metal-crosslinked ethylene/methacrylic acid, and ethylene/vinyl alcohol copolymers. The ethylene copolymer contains the ethylene component unit in an amount of not less than 70 molt, and preferably not less than 90 mol %.

Examples of said another copolymers include propylene homopolymers, propylene/ethylene copolymers, propylene/butene copolymers, propylene/ethylene/butene copolymers, propylene/maleic anhydride copolymers, styrene homopolymers, acrylonitrile/styrene copolymers, acrylonitrile/styrene/butadiene copolymers, styrene/maleic anhydride copolymers, styrene/acrylic acid copolymers, styrene/acrylic acid ester copolymers, styrene/methacrylic acid copolymers, styrene/methacrylic acid ester copolymers, high impact polystyrene, styrene/butadiene/styrene copolymers, styrene/butadiene/ethylene/styrene copolymers, styrene/isoprene/styrene copolymers, styrene/ethylene/propylene/styrene copolymers, ethylene/propylene rubbers, and ethylene/propylene/diene rubbers.

A resin indicated by I) above is selected in order to select the polyethylene resin for forming the foam layer of the foam-molded article of the present invention from mixed resins of high-density polyethylene and low-density polyethylene. The selection is not limited to a mixed resin of a specific high-density polyethylene and a specific low-density polyethylene, and a resin indicated by II) above may be selected to select the polyethylene resin for producing the foam layer of the foam-molded article of the present invention. The resin that satisfies the conditions described in I) will also very likely satisfy the conditions described in II), and such a resin would be a resin described in III).

According to the present invention, the foam layer for the foam-molded article of the present invention can be produced by selecting and using a polyethylene resin from among I), II), and III).

According to the research results obtained by the inventors of the present invention, the polyethylene resin of I) will very likely satisfy the thermal characteristics, MFR, and MT conditions for the resin in II), but no conclusion could be drawn that this would always be the case. Conversely, it is apparent that a polyethylene resin that satisfies the conditions for the resin described in II) will not always satisfy the conditions for the resin described in I), because the polyethylene resin that may be chosen may be a resin described in II) which is not limited to a mixed resin of a specific high-density polyethylene and a specific low-density polyethylene.

Other than a mixed resin of high- and low-density polyethylenes, examples of a polyethylene resin with which it is possible to satisfy the conditions for the resin described in II) include a mixed resin of high-, low-, and very low-density polyethylene resins, polyethylene resins treated by a peroxide treatment using a peroxide and antioxidant such that the insoluble content in boiled xylene is less than 1 wt %, and polyethylene resins produced with a polymerization method in which a metallocene catalyst and a Ziegler catalyst are used.

A polyethylene resin that satisfies condition I) and is used for forming a foam layer 3 on a parison 1 is such that the MFR of the specific high-density polyethylene is not less than 0.1 g/10 minutes, the MFR of the specific low-density polyethylene is not less than 0.2 g/10 minutes, and the MT of the specific low-density polyethylene is 2 cN or greater, whereby a parison 1 whose foam layer has a low apparent density and adequate cell structure can be produced without the melt viscosity of the molten resin composition being reduced largely because the heat generated inside the die by the expandable molten resin composition produced by kneading a foaming agent into the polyethylene resin can be inhibited. A parison 1 with little variation in its thickness can be produced because the drawdown amount of the parison in a softened state, can be reduced by using a polyethylene resin that satisfies condition I), wherein the MFR of the specific high-density polyethylene is 20 g/10 minutes or less, and the MFR of the specific low-density polyethylene is 20 g/10 minutes or less. By using a specific high-density polyethylene whose ratio is 40 wt % or more in the polyethylene resin used for forming the foam layer 3, a foam-molded article with excellent heat resistance and mechanical strength can be produced. By using a specific high-density polyethylene whose ratio is 85 wt % or less, a parison with a thick foam layer and low apparent density can be produced.

In the present invention, the polyethylene (A) comprising the resin of I) preferably has a density of 0.945 to 0.97 g/cm$^3$ and an MFR of 0.5 to 15 g/10 minutes, and the polyethylene (B) comprising the resin of I) preferably has a density of 0.91 to 0.93 g/cm$^3$, an MFR of 0.3 to 15 g/10 minutes, and an MT of 4 to 30 cN, but more preferably has a density of 0.91 to 0.93 g/cm$^3$, an MFR of 0.3 to 15 g/10 minutes, and an MT of 5 to 20 cN. In the present invention, the ratio of the polyethylene. (A) and the polyethylene (B) in the resin of I) is preferably 50 to 80 wt % polyethylene (A) and 20 to 50 wt % polyethylene. (B) (with the total of both polyethylenes constituting 100 wt %), but is more preferably 60 to 80 wt % polyethylene (A) and 20 to 40 wt % polyethylene (B) (with the total of both polyethylenes constituting 100 wt %).

The polyethylene resin that satisfies condition II) and is used for forming a foam layer 3 on a parison 1 has at least one endothermic peak having a top temperature of not less than 125° C. on a DSC curve obtained by differential scanning calorimetry such that the ratio of the heat quantity of the endothermic peak(s) at not less than 125° C. with respect to the total heat quantity of the endothermic peak(s) is 50 to 95%, making it possible to obtain a foam-molded article with excellent heat resistance and mechanical strength. A parison 1 with little variation in its thickness, with a foam layer 3 in which the apparent density is low and the cell structure is adequate, can be produced by using a polyethylene resin that satisfies condition II), wherein the MFR is 0.2 to 25 g/10 minutes, and the MT is 1.5 cN or greater.

In the present invention, the heat quantity (obtained by way of differential scanning calorimetry) of the endothermic peak(s) at a temperature of not less than 125° C. with respect to the total heat quantity of the endothermic peak(s) is preferably 60 to 95%, and is more preferably 70 to 95%; the MFR is preferably 0.2 to 20 g/10 minutes, and more preferably 0.5 to 15 g/10 minutes; and the MT is preferably 2 to 20 cN for the resin used as the polyethylene resin of II).

According to the method of the present invention, a polyethylene resin used for forming the foam layer 3 is selected from the resins I), II) and III) as mentioned in the above, which makes it possible to use not only new materials but also recycled material apt to exhibit instable physical properties. Specifically, if recycled resin is to be used as a part of or the entire polyethylene resin for forming the foam layer 3, the usability of the recycled resin can be determined depending on whether the recycled resin satisfies the requirements of the resin II), and so far as the requirements of the resin II) are satisfied, the recycled resin can be used for part of or the entire polyethylene resin material for forming the foam layer 3. Reuse of recycled resins is important in terms of reducing the cost of the material and environmental care.

Note that the preferred range of MFRs for the polyethylene (A) and the preferred ranges of MFRs and MTs for the polyethylene (B) constituting the polyethylene resin III) are respectively similar to the preferred range of MFRs for the polyethylene (A) and the preferred ranges of MFRs and MTs for the polyethylene (B) constituting the polyethylene resin I). Further, the preferred range of ratio of the heat quantity of the endothermic peak(s) at not less than 125° C. with respect to the total heat quantity of the endothermic peak(s) and the preferred range of MFRs for the polyethylene resin III) are respectively similar to the preferred range of ratios of the heat quantity of endothermic peak(s) and the preferred range of MFRs for the polyethylene resin II).

A physical foaming agent is used for forming the foam layer 3 composed of the polyethylene resin. Examples of the physical foaming agent include propane, n-butane, isobutane, n-pentane, isopentane, n-hexane, isohexane, cyclohexane, and other aliphatic hydrocarbons; methyl chloride, ethyl chloride, and other chlorohydrocarbons; 1,1,1,2-tetrafluoroethane, 1,1-difluoroethane, and other fluoro-aliphatic hydrocarbons; ethyl alcohol, methyl alcohol, and other alcohols;

dimethyl ether, diethyl ether, methyl ethyl ether, and other ethers; and other organic physical foaming agents; as well as carbon dioxide, nitrogen, water, and other inorganic physical foaming agents. These physical foaming agents may also be used as mixtures. The ratio of the carbon dioxide in the physical foaming agent in the present invention is preferably kept at 50 to 100 molt in order to shorten the cooling time in the molding step in which the parison 1 is sandwiched and molded between molds 5, or to shorten the ageing time required until the dimensions and physical properties of the foam-molded article 8 stabilize after molding; but a carbon dioxide ratio of 70 to 100 mol % is particularly preferred. The physical foaming agent for producing the expandable molten resin composition is preferably blended in a ratio of 0.1 to 0.8 mol per kilogram of polyethylene resin. A chemical foaming agent may also be used in combination with the above-described physical foaming agent within a range in which the goals and objects of the present invention can be achieved.

Examples of the thermoplastic resin used for the thermoplastic resin layer 4 when producing a parison 1 with a thermoplastic resin layer 4 on the surface of the foam layer 3, include the following: low-density polyethylene, linear low-density polyethylene, high-density polyethylene, ethylene/acrylic acid copolymers, ethylene/acrylic acid ester copolymers, ethylene/methacrylic acid copolymers, ethylene/methacrylic acid ester copolymers, ethylene/vinyl acetate copolymers, metal-crosslinked ethylene/methacrylic acid; ethylene/vinyl alcohol copolymers, and other polyethylene resins; and propylene homopolymers, propylene/ethylene copolymers, propylene/butene copolymers, propylene/ethylene/butene copolymers, propylene/maleic anhydride copolymers, and other polypropylene resins; as well as polystyrene resins, polycarbonates, polyesters, polyamides, and the like. Furthermore, the thermoplastic resin may be one obtained by mixing two or more types selected from the resins listed above. Particularly preferred as the thermoplastic resin is a polyolefin resin, which has excellent flexibility and workability. Polyethylene resin is preferred because of its excellent recycling properties, low-temperature impact resistance, and adhesiveness with the foam layer 3.

The thermoplastic resin layer 4 may be provided either on the inside or on the outside of the foam layer 3 as described above, or it may be provided to both. However, forming the thermoplastic resin layer on the outside of the foam-molded article 8 is preferred because of the improved external appearance and mechanical strength of the foam-molded article 8. Thus, when a thermoplastic resin layer is formed, the resin layer 4 is preferably formed at least on the outside of the foam layer 3, as shown in FIG. 1.

Normally, 0.1 to 3 parts by weight of talc, silica, or other nucleating agent with respect to 100 parts by weight of the polyethylene resin is added to the expandable molten resin composition comprising the foam layer 3. Furthermore, UV absorbers, infrared absorbers, infrared reflectors, flame retardants, fluidity improvers, weatherproofing agents, colorants, antibacterial agents, antifungal agents, thermal stabilizers, antioxidants, inorganic fillers, or other types of additives may be added as required to the melted resin comprising the thermoplastic resin layer 4 or to the expandable molten resin composition comprising the foam layer 3.

Described below is the foam-molded article of the present invention.

The polyethylene resin comprising the foam layer 3a of the foam-molded article 8 of the present invention may be composed of the above-described polyethylene resin used for forming the foam layer 3 of the parison 1. The thermoplastic resin comprising the thermoplastic resin layer 4a of the optional foam-molded article 8 may be composed of the above-described thermoplastic resin used for forming the thermoplastic resin layer 4 of the parison 1.

The foam layer 3a of the foam-molded article 8 of the present invention has an apparent density of 0.04 to 0.3 g/cm$^3$. When the apparent density of the foam layer 3a in the foam-molded article is less than 0.04 g/cm$^3$, the compressive strength, the flexural elastic modulus, and other mechanical physical properties are deteriorated, and when the density is greater than 0.3 g/cm$^3$, the lightweight, thermal-insulating characteristics, flexibility, and other properties are adversely affected.

It can be seen that the foam layer 3a can be produced from polyethylene resin that satisfies the condition II) as a result of the fact that a DSC curve obtained by performing differential scanning calorimetry on the foam layer 3a of the foam-molded article 8 of the present invention exhibits at least one endothermic peak having a top temperature of not less than 125° C. (The upper limit of the temperature is about 180° C.), the ratio of the heat quantity of the endothermic peak(s) at not less than 125° C. (The upper limit of the temperature is about 180° C.) with respect to the total heat quantity of the endothermic peak(s) being 50 to 95%, that the MFR of the foam layer 3a is 0.2 to 25 g/10 minutes, and that the MT of the foam layer 3a is 1.5 cN or greater (The upper limit of MT is about 40 cN).

Hence, the foam-molded article of the present invention, obtained by using a polyethylene resin that satisfies condition II), can be defined by following the foam-molded article, which is a foam-molded article obtained by sandwiching between molds a parison with a foam layer formed by extruding and foaming an expandable molten resin composition, obtained by melt-kneading a polyethylene resin and a physical foaming agent, to an area of low pressure from a die; wherein the apparent density of the foam layer in the foam-molded article is about 0.04 to 0.3 g/cm$^3$; there is at least one endothermic peak having a top temperature of not less than 125° C. on a DSC curve obtained by differential scanning calorimetry on the foam layer of the foam-molded article; the ratio of the heat quantity of the endothermic peak(s) at not less than 125° C. with respect to the total heat quantity of the endothermic peaks on the DSC curve is 50 to 95%; MFR on the foam layer of the foam-molded article is 0.2 to 25 g/10 minutes: and MT on the foam layer of the foam-molded article is not less than 1.5 cN.

The aforementioned aspect of the DSC curve produced by differential scanning calorimetry of the foam layer 3a indicates that the foam-molded article possesses excellent heat resistance and mechanical strength. The fact that the MFR and MT of the foam layer 3a are kept in the above-stated ranges also indicates that the foam-molded article possesses excellent thermal-insulating characteristics, lightweight, external appearance, mechanical strength, and dimensional stability.

In the foam-molded article 8 of the present invention, the apparent density of the foam layer 3a is preferably 0.05 to 0.2 g/cm$^3$, and more preferably 0.06 to 0.2 g/cm$^3$; the heat quantity of the endothermic peak(s) at not less than 125° C. obtained by differential scanning calorimetry of the foam layer 3a, is preferably 60 to 95%, and particularly preferably 70 to 95%, in relation to the total heat quantity of the endothermic peak(s); and the foam layer 3a more preferably has MFR of 0.5 to 15 g/10 minutes, and MT of 2 to 20 cN.

The closed cell ratio of the foam layer 3a of the foam-molded article 8 of the present invention is preferably 70% or more, but is more preferably 80% or more for excellent thermal insulating characteristics and mechanical physical properties.

The average thickness of the foam layer 3a of the foam-molded article 8 of the present invention is preferably 2 to 25 mm, more preferably 3 to 20 mm, and especially preferably 3 to 15 mm for excellent thermal insulating characteristics, mechanical physical properties, and other characteristics.

When the foam-molded article 8 has a plate shape, the thickness of the plate-shaped foam-molded article is preferably 10 to 50 mm, but more preferably 20 to 40 mm for reasons of excellent thermal insulating characteristics and mechanical strength.

The lower limit of the average cell diameter of the foam layer 3a on the foam-molded article 8 of the present invention is 0.1 mm or more, but more preferable is 0.3 mm or more; and the upper limit is 5.0 mm or less, more preferably is 3.0 mm or less, and particularly preferably 1.0 mm or less. When the average cell diameter is excessively small, wrinkles stemming from pleat-shaped unevenness generated in the parison 1 may be generated in the foam-molded article 8. On the other hand, when the average cell diameter is excessively large, the external appearance and thermal characteristics of the foam-molded article 8 may become inadequate for some applications.

By having the above-described physical properties, the foam-molded article 8 of the present invention possesses excellent lightweight, thermal-insulating characteristics, low-temperature impact resistance, soundproofing characteristics, vibration-proofing characteristics, and chemical resistance; exhibits excellent heat resistance and mechanical strength; and is appropriate for use in ducts, bath covers, insulation panels, containers, trunk lids, enclosures, sanitary and other daily necessities; and in automobile materials, electronic product materials, construction materials, civil engineering materials, and other applications. The foam-molded article of the present invention possesses excellent recycling properties. Specifically, the foam-molded article collected after use can be recycled for reuse as raw material without substantial deterioration of the physical properties.

Described below are methods for measuring the various physical properties of the polyethylene resin and the foam layer of the foam-molded article.

[Apparent Density of the Foam-Molded Article Foam Layer]

The foam layer 3a is cut from the foam-molded article 8 as a test piece, and the apparent density is computed by dividing the weight (g) of the test piece by the volume ($cm^3$) computed from the external dimensions of the test piece. However, the test piece that is used should be one that is cut from a portion in which the cells are not considerably deformed (a portion having substantially few locations where cells are significantly crushed or where cells are largely stretched out).

[MFR of the Polyethylene Resin or the Foam-molded Article Foam Layer]

A raw material in the form of polyethylene resin pellets, or a foam cut from the foam layer of a foam-molded article is used as a test piece, and the melt flow rate is the value measured at a temperature of 190° C. and a load of 21.18 N, based on JIS K7210 (1976). Care should be taken to avoid bubbles becoming mixed in with the molten resin extruded from the orifice during measurement.

[MT of the Polyethylene Resin or the Foam-molded Article Foam Layer]

Figure 3:
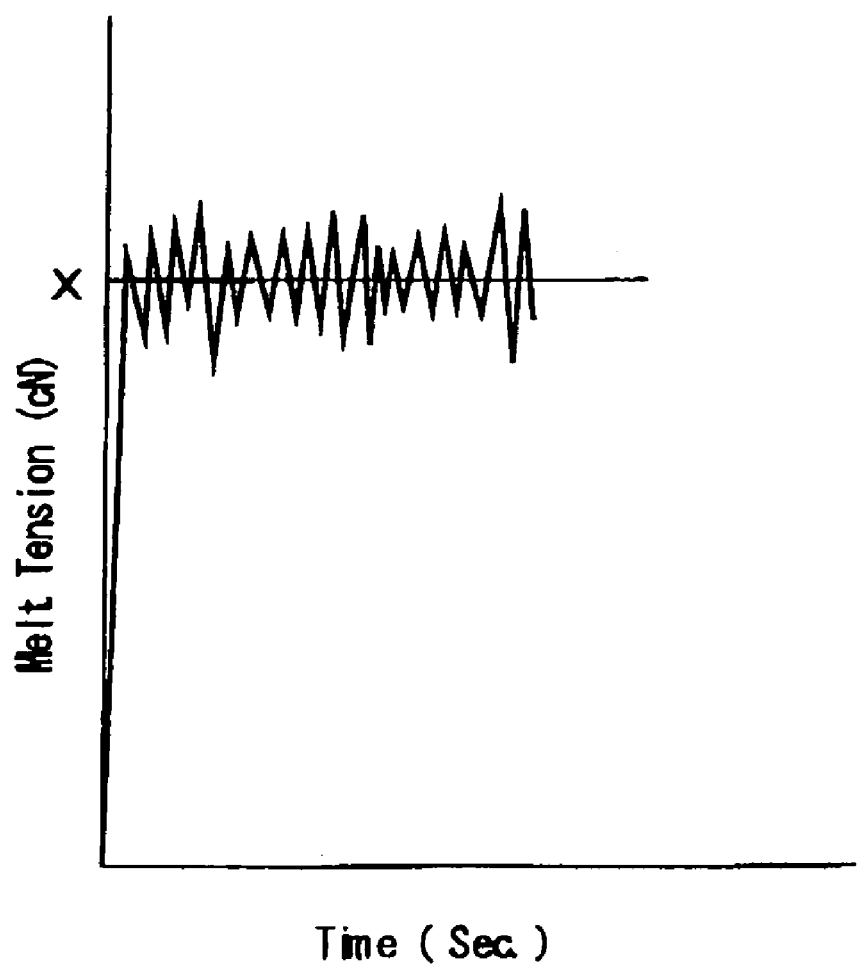
FIG. 3 is a graph depicting the relationship between melt tension and time when measuring melt tension.

A raw material in the form of polyethylene resin pellets, or a foam cut from the foam layer of a foam-molded article is used as a test piece, and the melt tension is measured using Melt Tension Tester II manufactured by Toyo Seiki Selsaku-Sho, Ltd. or another melt tension measuring device. More specifically, using a melt tension tester having an orifice diameter of a nozzle of 2.095 mm and a length of a nozzle of 8 mm, resin is extruded in the form of a string under conditions of a resin temperature of 190° C. and an extrusion piston velocity of 10 mm/minute from the orifice, and the resin string is set on a tension-detecting pulley with a diameter of 45 mm and is thereafter taken up with a roller having a diameter of 50 mm while the take-up velocity is gradually increased at a rate of about 5 rpm/sec (take-up acceleration of the resin string: $1.3 \times 10^{-2}$ m/sec$^2$). If the resin string does not break even after reaching a take-up velocity of 500 rpm, take-up is continued at the 500 rpm velocity, the MT of the resin string detected by a detector linked to the tension-detecting pulley is measured over time, the results are plotted on a chart with the MT (cN) on the Y-axis and the time (sec) on the X-axis, and an amplitude-depicting graph is obtained, as shown in FIG. 3. The MT in the present invention is defined as the median value (X) of the amplitude of the stable portion of the amplitude in FIG. 3. However, if the resin string breaks before the take-up velocity reaches 500 rpm, the take-up velocity at the time when the resin string breaks is shown as R (rpm). Next, "MT" is used to designate the value obtained by the measurement as described above from the graph shown in FIG. 3 and plotted by taking up the material at a fixed velocity of R×0.7 (rpm). During the measurement, care should be taken to avoid bubbles becoming mixed in with the molten resin extruded from the orifice.

[Differential Scanning Calorimetry of the Polyethylene Resin or Foam-molded Article Foam Layer]

Figure 4:
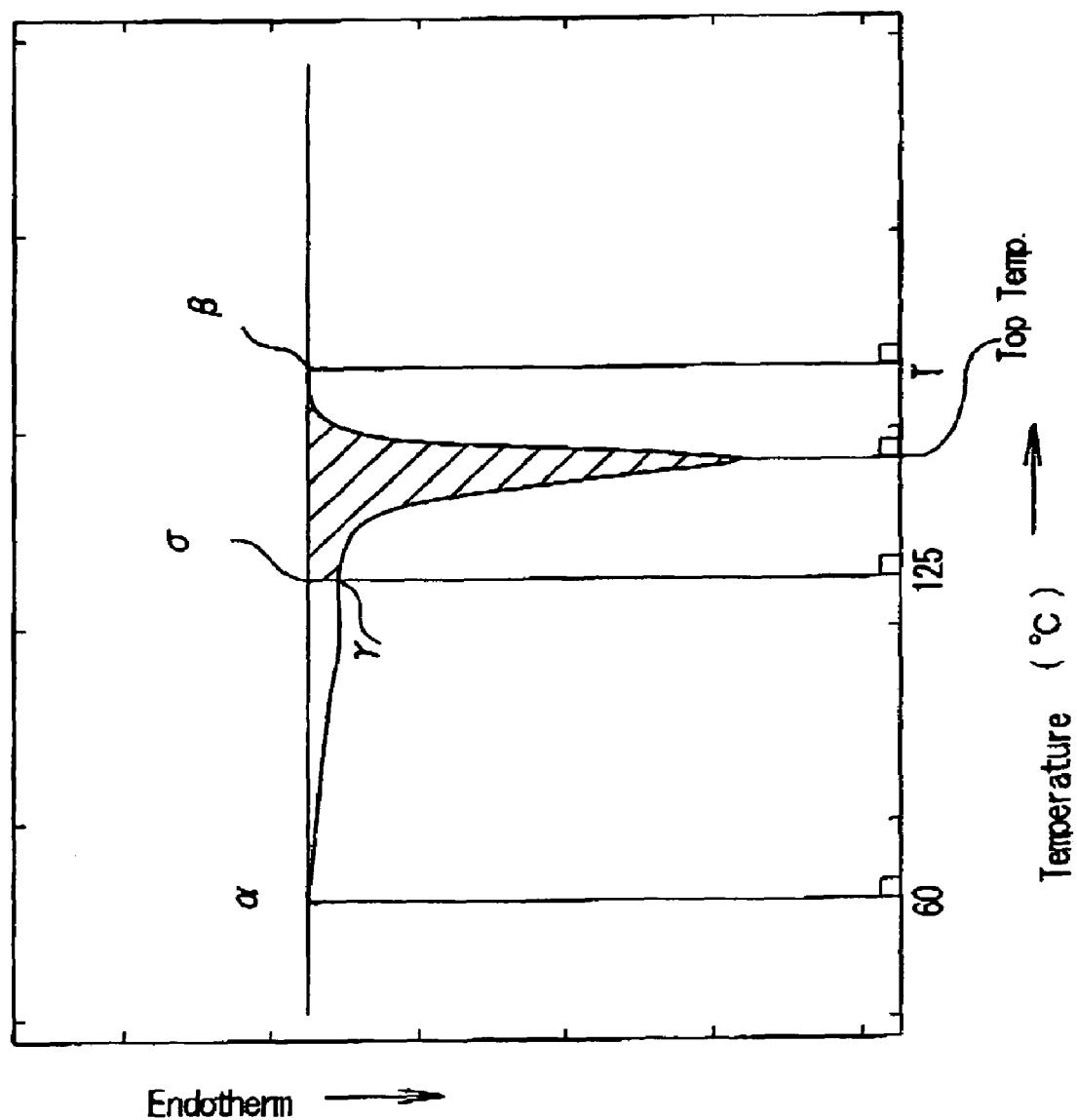
FIG. 4 is a diagram depicting the heats quantity of a endothermic peak on a differential scanning calorimetric curve.

About 2 mg of a raw material in the form of polyethylene resin pellets, or a foam cut from the foam layer of a foam-molded article is used as a test piece, and a first differential scanning calorimetric curve (may also be referred to hereinafter as a DSC curve) such as that shown in FIG. 4 is obtained by means of a differential scanning calorimeter when the temperature is raised from 25° C. to 200° C. at a rate of 10° C./min, based on JIS K7122 (1987). The total heat quantity (J/g) of the endothermic peak(s) and the heat quantity (J/g) of the endothermic peak(s) at a temperature of not less than 125° C. are computed as follows, based on the resulting DSC curve.

First, a straight line αβ is drawn to connect point a that corresponds to 60° C. on the DSC curve, and point β on the DSC curve that corresponds to the melt completion temperature T of the test piece. Next, a straight line parallel to the vertical axis of the graph is drawn through point γ on the DSC curve that corresponds to a temperature of 125° C., and the point that intersects with the straight line αβ is taken to be σ. The total heat quantity (J/g) of the endothermic peak(s) corresponds to the surround area of the portion enclosed by the DSC curve and the segment αβ, and the heat quantity (J/g) of the endothermic peak(s) at a temperature of not less than 125° C. corresponds to the surround area of the portion (the shaded portion of FIG. 4) enclosed by the DSC curve, segment αβ, and segment γσ. The above-stated melt completion temperature T is defined to be the temperature of the intersection between the base line and the DSC curve on the higher-temperature side of the highest-temperature of the endothermic peak.

[Average Thickness of the Foam-molded Article Foam Layer]

The average thickness of the foam layer 3a of the foam-molded article 8 is computed by measuring the thickness of the foam layer 3a from a cross-section of the foam-molded article that is vertical with respect to the extrusion direction of the parison 1 at 10 points at equivalent intervals, and taking the average thickness to be the arithmetic mean of these points. In the case of a solid foam-molded article or a partially hollow foam-molded article formed from a parison 1 in which a thermoplastic resin layer is not provided to the internal periphery of the foam layer 3 of the parison 1, the average thickness of the foam layer 3a of the foam-molded article 8 is a value that is half the thickness of the foam layer formed by fusing the foam layers 3 of the parison 1 with each other, because the thickness of the foam layers is roughly double due to the fact that the innermost pairs of surfaces of the foam layer 3 of the parison 1 fuse with each other. However, because there are locations that are crushed or drawn out depending on the shape of the foam-molded article, measurement of the average thickness of the foam-molded article foam layer should avoid portions in which the cells are considerably deformed.

[Average Cell Diameter of the Foam-molded Article Foam Layer]

The average cell diameter of the foam layer 3a of the foamed article 8 is measured with a method that conforms to ASTM D3576-77. More specifically, a cross-section of the foam layer 3a is magnified and projected, a straight line with a length that corresponds to a length of 3 cm prior to magnification is drawn on the projection screen (however, when a straight line having a length that corresponds to the 3 cm cannot be drawn, then a straight line that is as long as possible should be drawn), the number of cells that intersect with this line is counted, the value computed by dividing the length of the straight line by the number of cells is further divided by 0.616, the average cell diameter in three directions (the extrusion direction of the parison, the circumferential direction, and the thickness direction) is computed, the arithmetic mean of the average cell diameters in three directions computed in such a manner is computed, and the computed value is taken as the average cell diameter of the foam layer 3a. However, because there are locations that are crushed or drawn out depending on the shape of the foam-molded article, measurement of the average cell diameter of the molded article foam layer should avoid portions in which the cells are considerably deformed.

[Closed Cell Ratio of the Foam-molded Article Foam Layer]

The closed cell ratio of the foam-molded article foam layer is computed by cutting the foam layer 3a from a foam-molded article 8 as a test piece, computing Vx in accordance with procedure C of ASTM D2856-70 (requalified in 1976), and calculating the ratio with the following Eq. (1). However, a test piece that is not cut from a portion in which the cells are considerably deformed (a portion having substantially few locations where cells are significantly crushed or where cells are largely stretched out) should be used.

$$\text{Closed cell ratio}(\%) = (Vx - Va(\rho f/\rho s)) \times 100/(Va - Va(\rho f/\rho s)) \quad (1)$$

Vx: True volume of the test piece (the sum of the volume of the closed cell portion and the volume of the resin portion) (cm$^3$)
Va: Apparent volume computed from the external dimensions of the test piece (cm$^3$)
ρf: Apparent density of the test piece (g/cm$^3$)
ρs: Density of the resin comprising the test piece (g/cm$^3$)

The present invention is described in detail below with the aid of examples.

EXAMPLES 1 TO 6 AND COMPARATIVE EXAMPLES 1 TO 5

A base resin (100 parts by weight) in which a high-density polyethylene (density: 0.964 g/cm$^3$, MFR: 8 g/10 minutes; MT: 1.2 cN, melting point: 133° C.) and a low-density polyethylene (density: 0.917 g/cm$^3$, MFR: 4.7 g/10 minutes; MT: 6.2 cN, melting point: 107° C.) were mixed in the ratios shown in TABLE 1, and 2 parts by weight of a nucleating agent master batch (a nucleating agent master batch in which 10 parts by weight of sodium bicarbonate and 10 parts by weight of sodium citrate were blended with 80 parts by weight of the polyethylene resin) were melt-kneaded in an extruder with a 65 mm inner diameter to form a resin composition, and a physical foaming agent shown in TABLE 1 was subsequently injected and kneaded so that the amounts shown in TABLE 1 per kilogram of base resin were injected into the resin composition to form an expandable molten resin composition from the midportion of the extruder. Next, the expandable molten resin composition was loaded into an accumulator connected to the extruder. The expandable molten resin composition was subsequently caused to foam by being extruded from an annular die, connected to the downstream of the accumulator, to an atmosphere-pressure area at the extrusion temperature and discharge velocity shown in TABLE 1 to form a parison. The parison was sandwiched between two equally divided metal molds positioned directly below the die, and the external periphery of the parison was caused to adhere to the internal peripheral surface of the molds and was then molded. A parison for molding a duct (which is a cylindrically-shaped hollow foam-molded article) and a parison for molding a panel (which is a solid foam-molded article) were used. The shapes and characteristics of the resulting foam-molded articles are shown in TABLE 2.

It was not possible to produce a parison in comparative example 2. In examples 1 to 5 and comparative example 3, a hollow foam-molded article for an automobile air-conditioning duct with a hollow portion was produced by sandwiching and molding a parison between metal molds while injecting air, under such pressure as not to crush the foam layer, with the aid of an air blow pipe, as shown in FIG. 2, into a parison obtained as described above. The duct produced in examples 1 to 5 was an adequate hollow foam-molded article that possessed excellent heat resistance, mechanical strength, and low-temperature impact resistance. The mechanical physical properties and heat resistance of the duct obtained in comparative example 3 were inadequate. In example 3, a mixed molten resin was obtained by melt-kneading 30 wt % of the same low-density polyethylene described above with 70 wt % of a high-density polyethylene (density: 0.955 g/cm$^3$, MFR: 11 g/10 minutes; MT: 1 cN, melting point: 129° C.) inside an extruder with a 65 mm inner diameter, this molten resin and the above-described expandable molten resin composition were coextruded from a coextrusion annular die, connected to the accumulator, a multilayer parison with a polyethylene resin layer was formed on the inside and-outside of the foam layer, and the parison was sandwiched between metal molds, yielding a hollow foam-molded article for an automobile air-conditioning duct with a hollow portion in which a polyethylene resin layer with an average thickness of 1 mm was provided on the inside and outside. The duct obtained in example 3 had particularly excellent external appearance and mechanical physical properties.

In comparative example 1, a parison obtained in the manner described above was sandwiched between metal molds, the opposing internal surfaces of the parison were fused and molded while the air was evacuated from inside the parison using the air blow pipe as the pipe for evacuating air, and a solid foam-molded article panel without a hollow portion with a total thickness of 4 mm was obtained. In example 6 and comparative examples 4 and 5, coextrusion was used to form a multilayer parison with a polyethylene resin layer composed of the same mixed molten resin as in example 3 solely on the outside of the foam layer by coextrusion in accordance with the method in example 3, the parison was sandwiched between metal molds, and the opposing inside surfaces of the parison were fused and molded while the air was evacuated from inside the parison using the air blow pipe as the pipe for evacuating air, yielding a solid foam-molded article panel without a hollow portion which had a total thickness of 12 mm and in which a polyethylene resin layer with an average thickness of 2 mm was provided on the outside. The panel obtained in example 6 was found to possess excellent mechanical strength, as evidenced by a bending load of 1.32 kN at 3 mm flexure measured using a test piece with a width of 70 mm, a length of 250 mm, and a thickness of 12 mm (total panel thickness) at a test velocity of 10 mm/min and a fulcrum spacing of 200 mm on the basis of JIS K7221 (1984); and it was also found to posses excellent low-temperature impact resistance, as evidenced by finding no cracks in the panel even when a 300 g steel ball was dropped vertically onto the panel from a height of 1 m at a temperature of −30° C. The panels obtained in comparative examples 1 and 4 had inadequate heat resistance and lightweight, and the panel obtained in example 5 was found to have inadequate mechanical strength, as evidenced by a bending load of 0.81 kN at 3 mm flexure measured using a test piece with a width of 70 mm, a length of 250 mm, and a thickness of 12 mm (total panel thickness) at a test velocity of 10 mm/min and a fulcrum spacing of 200 mm on the basis of JIS K7221 (1984).

COMPARATIVE EXAMPLE 6

A solid foam-molded article panel in which there was no hollow portion, which has a total thickness of 12 mm, and in which a polypropylene resin layer with an average thickness of 2 mm was provided on the outside was obtained the same manner as example 6, except that the polyethylene resin comprising the foam layer, and the polyethylene resin comprising the resin layer formed on the outside of the foam layer were changed to a polypropylene resin (manufactured by SunAllomer Ltd.; registered trade name: PF-814, polypropylene homopolymer; density: 0.900 g/cm$^3$; MFR: 3 g/10 minutes (temperature 230° C., load 21.18 N); MT: 22 cN (temperature 230° C.,) melting point 160° C.). The bending load of the resulting panel was found to be 1.38 kN at 3 mm flexure measured using a test piece with a width of 70 mm, a length of 250 mm, and a thickness of 12 mm (total panel thickness) at a test velocity of 10 mm/min and a fulcrum spacing of 200 mm on the basis of JIS K7221 (1984); and cracks were observed in the panel when a 300 g steel ball was dropped vertically onto the panel from a height of 0.5 m at a temperature of −30° C.; so while the mechanical strength was excellent, low-temperature impact resistance was inadequate. The shapes and characteristics of the resulting foam-molded articles are shown in TABLE 2.

Descriptions for *1, *2, and *3 of Table 2 are as follows.

*1 refers to the percentage of the heat quantity (J/g) of the endothermic peak at a temperature of not less than 125° C. with respect to the total heat quantity (J/g) of the endothermic peak, calculated by the differential scanning calorimetry of the foam layer in the foam-molded article.

*2 The thermal conductivity was measured for each panel in example 6 and comparative examples 1, and 4 to 6. A test piece with a longitudinal of 150 mm, a transversal of 150 mm, and a thickness of 12 mm (total panel thickness) was cut from each of the panels, and measured with the plate beat flow method (heat flow meter method, double piece method, average temperature 20° C.) on the basis of JIS A1412 (1994). Provided that test pieces with a thickness of 4 mm were tripled for a test piece with a thickness of 12 mm used for comparative example 1.

*3 The percent of change in the dimensions due to heating was computed by heating and holding a foam-molded article at 90° C. for 24 hours, thereafter cooling the article to normal temperature, measuring the length of the portion having the maximum length in the parison extrusion direction of the foam-molded article before and after heating, and computing the percent of change in the dimensions due to heating by means of Eq. (2).

$$\text{Percent of dimensional change due to heating}(\%) = (L1-L2) \times 100/L1 \qquad (2)$$

L1: Maximum length in the parison extrusion direction of the foam-molded article before heating L2: Maximum length in the parison extrusion direction of the foam-molded article after heating.

TABLE 1

| | | Expandable Molten Resin Composition | | | | | |
|---|---|---|---|---|---|---|---|
| | | Base Resin | | Foaming Agent | | | |
| | | High-density polyethylene (wt %) | Low-density polyethylene (wt %) | Type | Injection amount (mol/kg) | Extrusion temperature (° C.) | Discharge velocity (kg/(h · cm$^2$)) |
| Examples | 1 | 70 | 30 | isobutane | 0.34 | 136 | 38 |
| | 2 | 80 | 20 | isobutane | 0.30 | 138 | 43 |
| | 3 | 70 | 30 | isobutane | 0.34 | 137 | 34 |
| | 4 | 70 | 30 | carbon dioxide | 0.23 | 138 | 36 |
| | 5 | 50 | 50 | carbon dioxide | 0.27 | 134 | 37 |

TABLE 1-continued

| | | Expandable Molten Resin Composition | | | | | |
|---|---|---|---|---|---|---|---|
| | | Base Resin | | Foaming Agent | | | |
| | | High-density polyethylene (wt %) | Low-density polyethylene (wt %) | Type | Injection amount (mol/kg) | Extrusion temperature (° C.) | Discharge velocity (kg/(h · cm$^2$)) |
| | 6 | 70 | 30 | carbon dioxide | 0.34 | 138 | 65 |
| Comparative Examples | 1 | 100 | 0 | isobutane | 0.10 | 139 | 60 |
| | 2 | 90 | 10 | isobutane | 0.34 | 139 | 46 |
| | 3 | 30 | 70 | isobutane | 0.34 | 133 | 34 |
| | 4 | 70 | 30 | carbon dioxide | 0.07 | 138 | 60 |
| | 5 | 0 | 100 | carbon dioxide | 0.34 | 120 | 60 |
| | 6 | * | | carbon dioxide | 0.34 | 163 | 62 |

*: Polypropylene 100 wt

TABLE 2

| | | Foam-Molded Article | | | | | | | | | |
|---|---|---|---|---|---|---|---|---|---|---|---|
| | | Foam Layer of Foam-Molded Article | | | | | | | | *3 Ratio of | |
| | | Apparent density (g/cm$^2$) | *1 Ratio of heat quantity at andothermio peak (%) | MFR (g/10 minutes) | MT (cN) | Closed cell ratio (%) | Average cell diameter (mm) | Average thickness of foam layer (mm) | *2 Thermal conductivity (W/mK) | Weight of foam-molded article (kg) | change in dimensions due to heating (%) | Shape of foam-molded article |
| Examples | 1 | 0.138 | 80 | 1.4 | 2.8 | 28 | 0.5 | 4 | Not measured | 0.12 | 2.6 | Hollow |
| | 2 | 0.151 | 93 | 1.2 | 2.1 | 36 | 0.6 | 4 | Not measured | 0.13 | 1.8 | Hollow |
| | 3 | 0.142 | 82 | 1.5 | 2.7 | 56 | 0.5 | 3 | Not measured | 0.18 | 2.3 | Hollow |
| | 4 | 0.198 | 83 | 1.3 | 2.8 | 69 | 0.7 | 4 | Not measured | 0.17 | 2.0 | Hollow |
| | 5 | 0.176 | 73 | 2.0 | 3.7 | 78 | 0.6 | 5 | Not measured | 0.15 | 3.2 | Hollow |
| | 6 | 0.165 | 83 | 1.5 | 2.6 | 86 | 0.9 | 4 | 0.042 | 0.95 | 1.8 | Solid |
| Comparative Examples | 1 | 0.388 | 100 | 0.5 | 1.3 | 16 | 1.0 | 4 | 0.084 | 2.2 | 1.8 | Solid |
| | 2 | Unable to produce a molded article | | | | | | | | | | |
| | 3 | 0.130 | 51 | 4.5 | 4.6 | 72 | 0.5 | 5 | Not measured | 0.11 | 9.7 | Hollow |
| | 4 | 0.45 | 82 | 1.3 | 2.6 | 88 | 1.0 | 4 | 0.088 | 2.5 | 1.3 | Solid |
| | 5 | 0.161 | 0 | 5.0 | 7.3 | 89 | 0.9 | 4 | 0.043 | 0.93 | 12.4 | Solid |
| | 6 | 0.155 | — | 7.8 | 5.6 | 91 | 0.8 | 4 | 0.040 | 0.69 | 1.5 | Solid |

What is claimed is:

1. A method for manufacturing a foam-molded article by molding between molds a parison with a foam layer formed by extruding an expandable molten resin composition, obtained by melt-kneading a polyethylene resin and a physical foaming agent, to an area of low pressure from a die, wherein the polyethylene resin is selected from at least one of the following I), II), and III), and wherein the apparent density of the foam layer in the foam-molded article is about 0.04 to 0.3 g/cm$^3$;

I) a resin comprising 40 to 85 wt % polyethylene (A) with a density that is more than 0.94 g/cm3 and not more than 0.97 g/cm3, and a melt flow rate of 0.1 to 20 g/10 minutes; and 15 to 60 wt % polyethylene (B) with a density of 0.89 to 0.94 g/cm3, a melt flow rate of 0.2 to 20 g/10 minutes, and a melt tension of not less than 2 cN (provided that the total of polyethylene (A) and (B) is 100 wt %), II) a resin which has at least one endothermic peak having a top temperature of not less than 125° C. on a DSC curve obtained by differential scanning calorimetry, and in which the ratio of the heat quantity of the endothermic peak(s) at not less than 125° C. with respect to the total heat quantity of the endothermic peak(s) is 50 to 95%. melt flow rate is 0.2 to 25 g/10 minutes, and melt tension is not less than 1.5 cN.

III) a resin which comprises 40 to 85 wt % polyethylene (A) having a density more than 0.94 g/cm3 and not more than 0.97 g/cm3, and a melt flow rate of 0.1 to 20 g/10 minutes; and 15 to 60 wt % polyethylene (B) having a density of 0.89 to 0.94 g/cm3, a melt flow rate of 0.2 to 20 g/10 minutes, and a melt tension of not less than 2 cN (provided that the total of polyethylene (A) and (B) is 100 wt %); which has at least one endothermic peak having a top temperature of not less than 125° C. on a DSC curve obtained by differential scanning calorimetry; and in which the ratio of the heat quantity of the endothermic peak(s) at not less than 125° C. with respect to the total heat quantity of the endothermic peak(s) is 50 to 95%, melt flow rate is 0.2 to 25 g/10 minutes, and melt tension is not less than 1.5 cN.

2. The method for manufacturing a foam-molded article according to claim 1, wherein the physical foaming agent contains 50 to 100 mol % of carbon dioxide.

3. The method for manufacturing a foam-molded article according to claim 1, wherein the parison is a multilayer parison having a thermoplastic resin layer on the inside and/or on the outside of the foam layer.

4. The method for manufacturing a foam-molded article according to claim 1, wherein the foam layer in the foam-molded article has a thickness of 2 to 25 mm.

5. The method for manufacturing a foam-molded article according to claim 1, wherein the closed cell ratio of the foam layer in the foam-molded article is not less than 70%.

6. The method for manufacturing a foam-molded article according to claim 1, wherein the average cell diameter of the foam layer in the foam-molded article is 0.1 to 5 mm.

* * * * *